United States Patent Office 2,916,530
Patented Dec. 8, 1959

2,916,530

PREPARATION OF PARA-DIALKYL SUBSTITUTED AROMATIC COMPOUNDS

Herman S. Bloch, Skokie, Ill., assignor, by mesne assignments, to Universal Oil Products Company, Des Plaines, Ill., a corporation of Delaware No Drawing. Application October 31, 1957
Serial No. 693,506

8 Claims. (Cl. 260—668)

This application is a continuation-in-part of my co-pending application Serial No. 493,060, filed March 8, 1955, now Patent 2,838,581, issued June 10, 1958. This invention relates to a process for preparing para-dialkyl substituted aromatic compounds, and more particularly to a process for preparing para-xylene.

The increased use of terephthalic acid as an intermediate in the preparation of synthetic fibers of the glycol-terephthalic type has increased the demand for para-xylene from which the terephthalic acid is prepared. Heretofore, the separation of para-xylene from its ortho- and meta-isomers has been relatively expensive due to difficulties encountered in the process involving the separation of the aforementioned isomers. For example, one method for preparing para-xylene from ethylbenzene and isomers of said para-xylene is to subject the mixture (o-xylene, m-xylene, p-xylene and ethylbenzene) to fractional distillation. However, inasmuch as para-xylene, meta-xylene and ethylbenzene all boil within a 3° C. range of each other, separation into the various components by fractional distillation is relatively difficult to accomplish.

One method of operation is to distill out the ortho-xylene which has a boiling point of approximately 5 to 6° above that of the other three components of the mixture. The para- and meta-xylene along with the ethylbenzene will then be separated into several fractions, and para-xylene is then separated out by crystallization from cuts containing the highest percentage. Another method of separating the para-xylene from the unwanted isomers is to displace the eutectic compositions of para- and meta-xylenes by the addition of a co-crystallizing agent such as carbon tetrachloride followed by cooling, the para-xylene and carbon tetrachloride thereby separating out of the mixture, and thereafter recovering said para-xylene by fractional distillation of the para-xylene-carbon tetrachloride mixture.

Still another method of recovering para-xylene is to partially sulfonate the mixture, separate the unsulfonated layer from the reaction mixture and crystallize the para-xylene from the mixture by lowering the temperature.

It can readily be seen from the above description that obtaining relatively pure para-xylene for the manufacture of terephthalic acid involves many steps which, as hereinbefore set forth, are relatively difficult and expensive to accomplish.

It is therefore an object of this invention to provide a relatively inexpensive and novel process for obtaining para-dialkyl substituted aromatic compounds.

A further object of this invention is to provide a process for preparing para-dialkyl substituted aromatic compounds such as para-xylene by condensing specific ketones and aldehydes.

A specific object of this invention is to provide a process for preparing para-xylene by condensing, in separate stages, acetone, acetaldehyde and propionaldehyde and separating the desired para-xylene from any ortho-xylene which may form therein.

One embodiment of the invention is found in a process for the preparation of a p-dialkyl substituted benzene which comprises condensing propionaldehyde and acetaldehyde in the presence of a basic condensation catalyst at a temperature in the range of from about 0° to about 150° C., separating the resultant condensation products from the reaction mixture, further condensing said products with acetone in the presence of a basic condensation catalyst at a temperature in the range of from about 0° to about 125° C., separating and recovering the desired p-dialkylbenzene.

A specific embodiment of the invention resides in a process for the preparation of p-xylene which comprises condensing equimolar proportions of propionaldehyde and acetaldehyde in the presence of a basic condensation catalyst at a temperature in the range of from about 0° to about 150° C., separating the resultant 2-methyl-3-hydroxybutyraldehyde and 3-hydroxyvaleraldehyde from the reaction mixture, further condensing the same with an equimolar proportion of acetone in the presence of a basic condensation catalyst at a temperature in the range of from about 0° to about 125° C., separating and recovering the desired p-xylene.

A more specific embodiment of the invention is found in a process for the preparation of p-xylene which comprises condensing equimolar proportions of propional dehyde and acetaldehyde in the presence of potassium carbonate at a temperature in the range of from about 0° to about 150° C., separating the resultant 2-methyl-3-hydroxybutyraldehyde and 3-hydroxyvaleraldehyde from the reaction mixture, further condensing the same with an equimolar proportion of acetone in the presence of a basic condensation catalyst at a temperature in the range of from about 0° to about 125° C., separating p-xylene from o-xylene, and recovering the former.

Other objects and embodiments referring to alternative basic condensation catalysts will be found in the following further detailed description of the invention.

It is now proposed that polyalkyl substituted, and particularly, ortho- and para-dialkyl substituted aromatic compounds be prepared by reacting or condensing equimolar quantities of ketones and aldehydes, the particular reactants used being dependent upon the length and number of the alkyl substituents desired on the aromatic ring.

One of the aldehydic reactants which may be used in this invention is an aldehyde having the general formula X—$CH_2$—CHO in which X comprises either a hydrogen radical, a halogen, nitro, sulfo, carboxy, carboxamido, hydroxy, etc. radical, or a hydrocarbon radical or hydrocarbon radical containing a substituent hereinbefore enumerated. The other aldehydic reactant used in the reaction has the general formula:

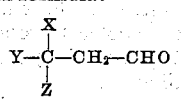

in which X Y and Z are independently selected from those substituents already listed above. The remaining reactant comprises a ketone having the general formula:

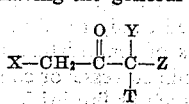

in which T, X, Y and Z are independently chosen from the hereinabove mentioned substituents. In the process of this invention, the preferred reactants comprise acetone, acetaldehyde and propionaldehyde. Other reactants which may be used include ethyl methyl ketone, diethyl ketone, methyl propyl ketone, ethyl propyl ketone, etc., butyraldehyde, valeric aldehyde, etc., or their T, X, Y and Z substituted homologues, such as chloroacetaldehyde, nitro-acetaldehyde β-chloropropionaldehyde, β,β-dichloropropionaldehyde, β-nitropropionaldehyde, β-sulfopropionaldehyde, β,β,β-trichloropropionaldehyde, α,α'dichloroacetone, etc., although not necessarily with equivalent results. It is to be understood that the above mentioned compounds are only examples of the aldehydes and ketones which may be used in this process and that said process is not necessarily limited to said compounds.

The reactions of this invention may be effected in the presence of mildly basic condensation and dehydration catalysts preferably solid basic condensation catalysts. Examples of catalysts which may be used in the present invention include the alkali metal and alkaline earth metal formates, acetates, carbonates, hydroxides, an oxide, such as lithium acetate, potassium acetate, sodium acetate rubidium acetate, cesium acetate, magnesium acetate, calcium acetate, barium acetate, strontium acetate, lithium formate, potassium formate, sodium formate, rubidium formate, cesium formate, magnesium formate, calcium formate, barium formate, strontium formate, lithium carbonate, potassium carbonate, sodium carbonate, rubidium carbonate, cesium carbonate, magnesium carbonate, calcium carbonate, barium carbonate, strontium carbonate, lithium hydroxide, potassium hydroxide, sodium hydroxide, rubidium hydroxide, cesium hydroxide, magnesium hydroxide, calcium hydroxide, barium hydroxide, strontium hydroxide, etc.

The initial condensation reaction between the aldehydes is carried out at temperatures in the range of from about 0° to about 150° C. and preferably at a temperature in the range of from about 40° to about 70° C. In addition the reaction takes place at atmospheric pressure; however, if higher temperatures are to be used the pressures are increased, said pressure used being in the range of from about 2 to about 100 atmospheres or more, the pressure being sufficient to maintain at least a portion of the reactants in the liquid phase. The second condensation step of the reaction between the condensation product of the first reaction and the desired ketone will take place under conditions similar to those hereinbefore set forth for the first reaction step.

The products resulting from the condensation of equimolar proportions of acetone, acetaldehyde and propionaldehyde as described herein comprise a mixture of o- and p-xylene, which due to the relatively wide disparity in boiling points (o-xylene boiling at 144.4° C. and p-xylene boiling at 138.4° C.) enables the two xylenes to be easily separated by fractional distillation.

The reaction of this invention may be effected in any suitable manner and may comprise either a batch or continuous type operation. When a batch operation is used, a quantity of each of the starting materials in equimolar proportions is placed in a suitable reaction vessel containing the desired catalyst. The vessel is then heated to the desired temperature and maintained thereat for a predetermined residence time. At the end of this time, the vessel and contents are cooled to room temperature and the reaction product separated by conventional means, such as fractional distillation.

When a continuous type operation is used, the starting materials are each continuously charged, in a separate stream, or two combined in one stream while the other is independently and subsequently admitted, to a reactor containing the desired catalyst and maintained at suitable operating conditions of temperature and pressure. The reactor may be an unlined vessel or coil or may contain an adsorbent material such as fire brick, dehydrated bauxite, or the like. Upon completion of the desired residence time, the products of the reaction comprising the o- and p-dialkyl substituted aromatic compounds are continuously withdrawn and subjected to fractional distillation whereby the p-dialkyl substituted aromatic compound is separated from the o-dialkyl substituted aromatic compound and/or unreacted starting materials or intermediates which may be present. In the preferred type of operation, as hereinafter described, two of the reactants are allowed to form condensation products, these are removed and by fractional distillation a fraction comprising the condensation product of one mol of each of the reactants is recovered from those by-products formed from two mols of one of the reactants, and said fraction is then allowed to react with the third reactant to form the desired end-products (i.e., ortho- and para- disubstituted aromatic hydrocarbons) which are then easily separated by fractionation.

This preferred continuous type of operation is used in order to minimize the interaction of two mols of any of the reactants with 1 mol of the other reactant, said reaction resulting in a yield of undesired side products or less valuable reaction products. For example, the interaction of 2 mols of acetone or 2 mols of propionaldehyde with 1 mol of acetaldehyde would result in the production of m-xylene, a particularly undesirable product in the preparation of p-xylene, due to the fact that the m-xylene and p-xylene boil within 1° C. of each other.

Yet another alternative which may be used is to add the third component of the reaction mixture down-stream of the point of introduction of the first two reactants in the same reactor, although this alternative generally gives lower yields of the desired products than the previous method in which the bimolecular intermediate condensation product is separately recovered and then subjected to further reaction.

In the interaction of acetaldehyde, propionaldehyde, and acetone to make xylenes, the reaction may be regarded as occurring in two stages—interaction of two of the components as a first stage, and condensation of the intermediate product with the third component as a second stage. If all three reactants were to be mixed and the reaction were to proceed non-selectively, the purpose of this invention would be defeated, since equal amounts of ortho-, meta- and para-xylenes would be formed and there would be, in addition, considerable amounts of open-chain by-products and condensation products containing fewer or more than eight carbon atoms. The preferred method of operation avoids these undesirable possibilities by a careful control of the order in which the reactions are allowed to proceed. This order is determined from the following considerations:

If the intial intermediate reaction is to be one between propionaldehyde and acetone, the two intermediates will be

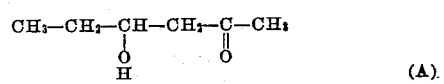

(A)

and

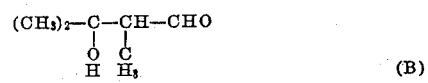

(B)

(A) on condensation with acetaldehyde, ring closure, and dehydration yields para-xylene; (B) yields ortho-xylene. But (A) and (B) are contaminated with bimolecular condensation products of two mols of acetone (diacetone alcohol) and of two mols of propionaldehyde, each of which, with acetaldehyde, yields meta-xylene (which is an undesirable product), and each of which, like (A) and (B) contains six carbon atoms. From this mixture of six carbon bimolecular intermediate products it is difficult to separate the desirable components from the undesirable, so that the reaction of propionaldehyde with acetone is not a preferred initial step.

A second possible initial step is the reaction of acetaldehyde with acetone. In this case, two five carbon intermediates are possible:

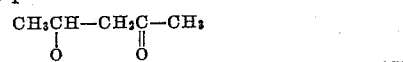

(C)

and

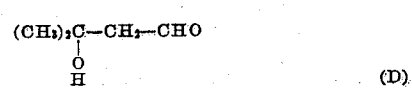

(D)

Both of these five carbon intermediates should be easily separable from aldol and diacetone alcohol formed as a result of the concurrent condensation of two mols of acetaldehyde or two mols of acetone, respectively. But of the two intercondensation products (C) and (D), it is found that (C) is formed preferentially; and (C), on interaction with propionaldehyde, yields ortho-xylene or open-chain products, while (D) yields para-xylene. The yields of para-xylene by this route are therefore poorer than desirable (although good yields of ortho-xylene may be obtained) and it is not the preferred method for preparing para-xylene.

The third (and preferred) initial reaction is that between acetaldehyde and propionaldehyde. Here again, two intercondensation products are possible, and these, since they contain five carbon atoms, are separable without difficulty from the four carbon or six carbon products formed by condensation of two mols of either of the reactants. The intercondensation products are:

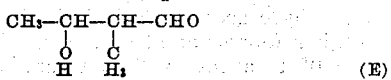
(E)

and

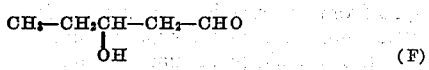
(F)

Of these two, (E) is formed preferentially, and on interaction with acetone (E) yields para-xylene; (F), with acetone, yields ortho-xylene. This route therefore affords the best potential yields of para-xylene, and is the preferred method for preparation of this material.

The following examples are given to illustrate the process of the present invention which, however, are not intended to limit the generally broad scope of the present invention in strict accordance therewith.

Example I

Eighty-eight g. of acetaldehyde and 116 g. of propionaldehyde are placed in a glass liner of a rotating autoclave having an 850 cc. capacity along with 5 g. of powdered anhydrous potassium carbonate. The glass liner is placed in the autoclave which is thereafter sealed and the reaction is allowed to proceed for 24 hours while said autoclave and contents thereof are maintained at about 50° C. At the end of this time the autoclave and contents thereof are cooled and the reaction products removed, washed and distilled. A fraction comprising the material boiling at 87–97° C. (20 mm.) is recovered (weight, 105 g.). This material is mixed with 60 g. of acetone, and to the mixture is added 5 g. of anhydrous potassium carbonate. The mixture is maintained at a temperature of about 60° C. and stirred for 20 hours. At the end of this time the reactor and contents thereof are allowed to return to room temperature and the reaction product is distilled, yielding a fraction boiling at 135–145° C. which weighs 48 g. and contains approximately 70% p-xylene and 30% o-xylene, which is redistilled to yield a fraction of pure p-xylene boiling at 138–139° C.

Example II

Eighty-eight g. of acetaldehyde and 116 g. of propionaldehyde are placed in a glass liner of a rotating autoclave along with 5 g. of sodium carbonate. The autoclave is sealed and heated to a temperature of approximately 50° C. and maintained thereat for a period of about 24 hours, at the end of which time the autoclave and contents thereof are allowed to cool to room temperature. The reaction products are removed, washed and subjected to fractional distillation under reduced pressure. The fraction boiling at 87–97° C. (20 mm.) is recovered. This fraction is mixed with 60 g. of acetone and 6 g. of sodium carbonate after which the mixture is maintained at a temperature of about 55° C. for an additional 20 hours. The reaction product from this condensation is subjected to fractional distillation yielding a fraction boiling at 135–145° C. Which, like the reaction product of Example I, contains approximately 70% p-xylene and 30% o-xylene. This fraction is again subjected to fractional distillation and the cut boiling at 138–139° C., comprising pure p-xylene, is separated and recovered.

Example III

Eighty-eight g. of acetaldehyde and 116 g. of propionaldehyde are reacted in a manner similar to that set forth in Examples I and II above in the presence of 5 g. of potassium acetate. The reaction product is recovered and the cut boiling between 87° and 97° C. (20 mm.) is further condensed with 60 g. of acetone in the presence of an additional 5 g. of potassium acetate. The desired product, comprising p-xylene, is recovered by means similar to that set forth in the above examples.

Example IV

Eighty-eight g. of acetaldehyde and 116 g. of propionaldehyde are condensed in the presence of 5 g. of calcium oxide in a manner similar to that set forth above. The desired reaction product, comprising a mixture of 2-methyl-3-hydroxybutyraldehyde and 3-hydroxyvaleraldehyde, is recovered and further condensed with acetone in the presence of an additional amount of calcium oxide. The desired reaction product comprising p-xylene, is recovered by conventional means.

Example V

A mixture of acetaldehyde and propionaldehyde in the presence of potassium formate is subjected to reaction conditions similar to that set forth in Example I above. The reaction product of this condensation, comprising a mixture of 2-methyl-3-hydroxybutyraldehyde and 3-hydroxyvaleraldehyde, is removed, washed and distilled. The fraction boiling between 87–97° C. (20 mm.) is recovered and further condensed with 60 g. of acetone in the presence of 5 g. of potassium formate. The condensation product of this reaction is treated in a manner similar to that set forth above, the desired product, comprising p-xylene boiling at a temperature in the range of from about 138–139° C. being separated and recovered by fractional distillation.

I claim as my invention:

1. A process for the preparation of p-xylene which comprises condensing propionaldehyde and acetaldehyde in the presence of a solid basic condensation catalyst selected from the group consisting of the alkali metal and alkaline earth metal formates, acetates, carbonates, hydroxides and oxides at a temperature in the range of from about 0° to about 150° C., separating the resultant condensation products from the reaction mixture, further condensing said products with acetone in the presence of a solid basic condensation catalyst selected from the group aforesaid at a temperature in the range of from about 0° to about 125° C., separating and recovering the desired p-xylene.

2. A process for the preparation of p-xylene which comprises condensing equimolar proportions of propionaldehyde and acetaldehyde in the presence of a solid basic condensation catalyst selected from the group consisting of the alkali metal and alkaline earth metal formates, acetates, carbonates, hydroxides and oxides at a temperature in the range of from about 0° to about 150° C., separating the resultant condensation products from the reaction mixture, further condensing said products with an equimolar proportion of acetone in the presence of a solid basic condensation catalyst selected from the group aforesaid at a temperature in the range of from about 0° to about 125° C., separating and recovering the desired p-xylene.

3. A process for the preparation of p-xylene which comprises condensing equimolar proportions of propionaldehyde and acetaldehyde in the presence of a solid basic condensation catalyst selected from the group consisting of the alkali metal and alkaline earth metal formates, acetates, carbonates, hydroxides and oxides at a temperature in the range of from about 0° to about 150° C., separating the resultant 2-methyl-3-hydroxybutyraldehyde and 3-hydroxyvaleraldehyde from the reaction mixture, further condensing the same with an equimolar proportion of acetone in the presence of a solid basic condensation catalyst selected from the group aforesaid at a temperature in the range of from about 0° to about 125° C., separating and recovering the desired p-xylene.

4. A process for the preparation of p-xylene which comprises condensing equimolar proportions of propionaldehyde and acetaldehyde in the presence of solid sodium carbonate at a temperature in the range of from about 0° to about 150° C., separating the resultant 2-methyl-3-hydroxybutyraldehyde and 3-hydroxyvaleraldehyde from the reaction mixture, further condensing the same with an equimolar proportion of acetone in the presence of solid sodium carbonate at a temperature in the range of from about 0° to about 125° C., separating and recovering the desired p-xylene.

5. A process for the preparation of p-xylene which comprises condensing equimolar proportions of propionaldehyde and acetaldehyde in the presence of solid potassium carbonate at a temperature in the range of from about 0° to about 150° C., separating the resultant 2-methyl-3-hydroxybutyraldehyde and 3-hydroxyvaleraldehyde from the reaction mixture, further condensing the same with an equimolar proportion of acetone in the presence of solid potassium carbonate at a temperature in the range of from about 0° to about 125° C., separating and recovering the desired p-xylene.

6. A process for the preparation of p-xylene which comprises condensing equimolar proportions of propionaldehyde and acetaldehyde in the presence of solid potassium acetate at a temperature in the range of from about 0° to about 150° C., separating the resultant 2-methyl-3-hydroxybutyraldehyde and 3-hydroxyvaleraldehyde from the reaction mixture, further condensing the same with an equimolar proportion of acetone in the presence of solid potassium acetate at a temperature in the range of from about 0° to about 125° C., separating and recovering the desired p-xylene.

7. A process for the preparation of p-xylene which comprises condensing equimolar proportions of propionaldehyde and acetaldehyde in the presence of calcium oxide at a temperature in the range of from about 0° to about 150° C., separating the resultant 2-methyl-3-hydroxybutyraldehyde and 3-hydroxyvaleraldehyde from the reaction mixture, further condensing the same with an equimolar proportion of acetone in the presence of calcium oxide at a temperature in the range of from about 0° to about 125° C., separating and recovering the desired p-xylene.

8. A process for the preparation of p-xylene which comprises condensing equimolar proportions of propionaldehyde and acetaldehyde in the presence of solid potassium formate at a temperature in the range of from about 0° to about 150° C., separating the resultant 2-methyl-3-hydroxybutyraldehyde and 3-hydroxyvaleraldehyde from the reaction mixture, further condensing the same with an equimolar proportion of acetone in the presence of solid potassium formate at a temperature in the range of from about 0° to about 125° C., separating and recovering the desired p-xylene.

References Cited in the file of this patent

UNITED STATES PATENTS 2,838,581    Bloch _____ June 10, 1958

OTHER REFERENCES

Noller: Chemistry of Organic Compounds, 1951, N. B. Saunders Co., Phila., Pa., pages 203 and 206 only relied on.